Henry F. Schmidt
INVENTOR

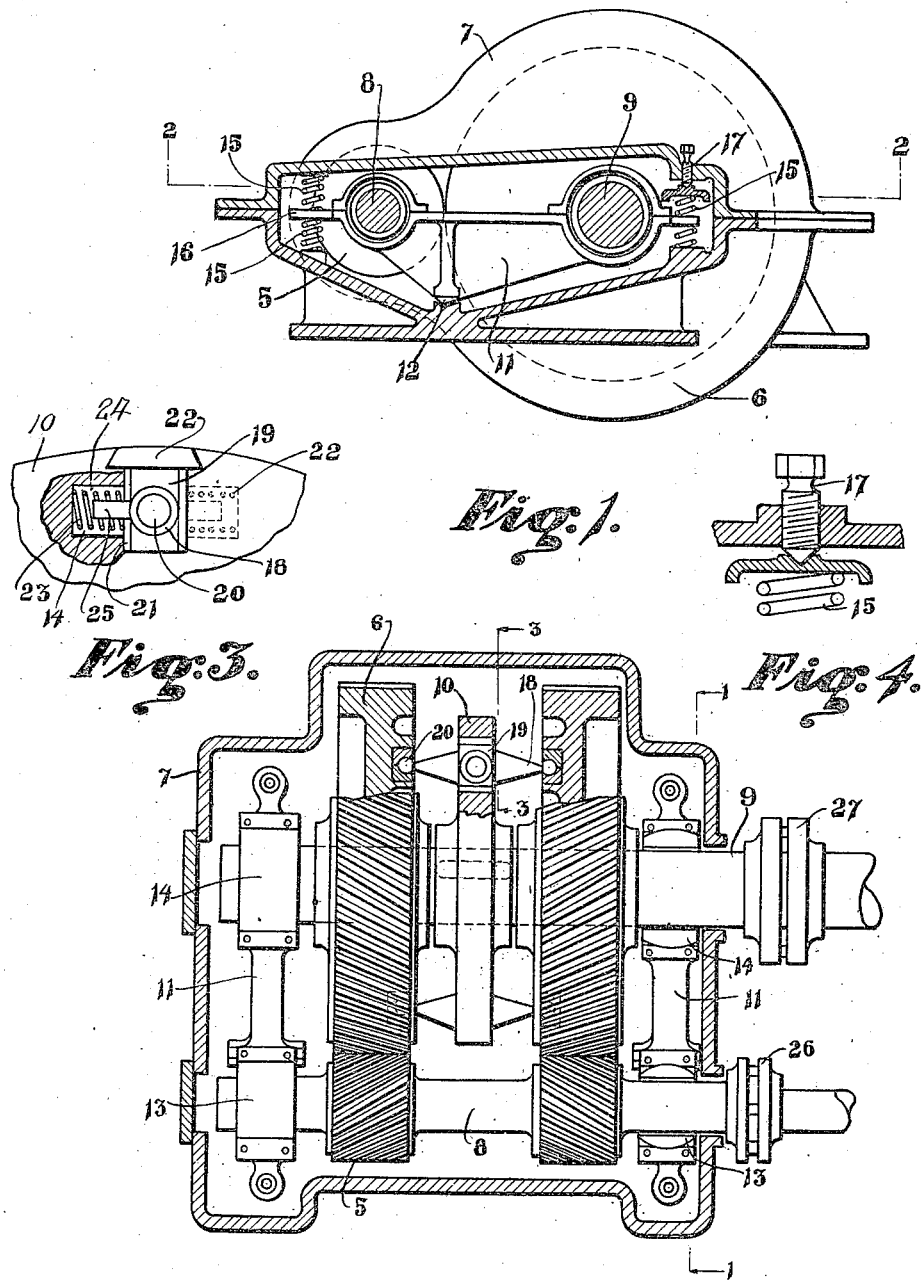

Patented Aug. 5, 1924.

1,503,919

UNITED STATES PATENT OFFICE.

HENRY F. SCHMIDT, OF SWARTHMORE, PENNSYLVANIA, ASSIGNOR TO WESTINGHOUSE GEAR AND DYNAMOMETER COMPANY, A CORPORATION OF PENNSYLVANIA.

GEARING.

Application filed April 14, 1921. Serial No. 461,207.

*To all whom it may concern:*

Be it known that I, HENRY F. SCHMIDT, a citizen of the United States, and a resident of Swarthmore, in the county of Delaware and State of Pennsylvania, have invented a new and useful Improvement in Gearing, of which the following is a specification.

My invention relates to gearing, particularly of the reduction type, and has for its object to provide apparatus of the character designated in which tooth pressures shall be equalized and in which the gear members shall be maintained a fixed distance apart when one is tilted relatively to the other.

In gearing of the floating frame type, it is customary to mount at least one member of the gear set in a rigid frame which is flexibly mounted in such a manner that the gear member is capable of a limited angular movement in a plane parallel to the tangential plane passing through the line of contact of the pitch cylinders of the cooperating gear members. That is, in a gear set, in which the pinion is located at the side of the gear, the pinion is flexibly mounted so that it may tilt in a vertical plane and thereby compensate for deflections and distribute the load along its length. In such gearing, the movement of the pinion, where contacting with the gear, is in a tangential plane, and it is therefore evident that any tilting from the mid or normal position results in a slight variation in the center distance between the axes of the gear and of the pinion and, consequently, in a shifting of the points of contact between the teeth. This, of course, results in a change in the diameters of the contact circles and may result in faulty operation of the gearing, if the variation is sufficiently great.

By my construction I provide means whereby slight tilting of the gear members does not set up this disturbing action and possible faulty operation.

In the accompanying drawings: Figure 1 is a diagrammatic end view along the line I—I of Figure 2 of a gear set embodying my invention, a part of the apparatus being illustrated in section;

Figure 2 is a sectional view along the line II—II of Figure 1;

Figure 3 is a sectional view along the line III—III of Figure 2;

Figure 4 is a fragmentary sectional view of an adjusting screw; and

Figure 5:
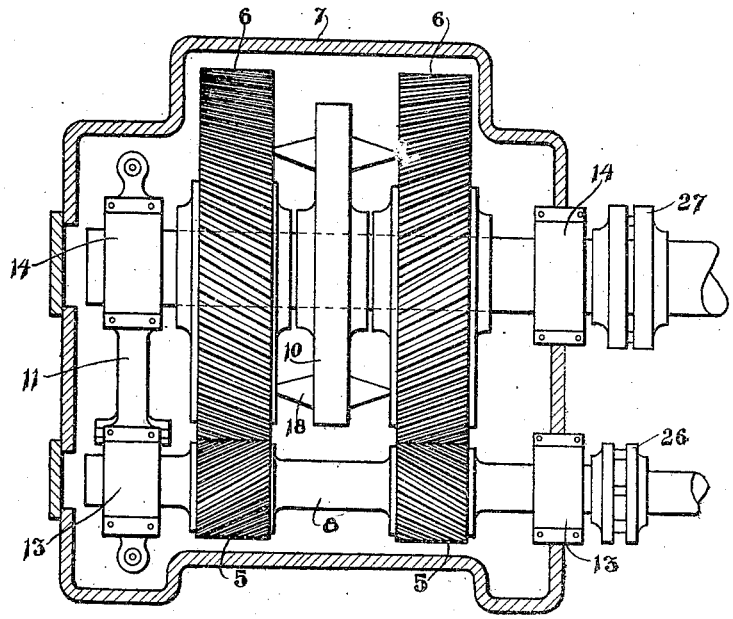
Figures 5 and 6 show modified forms of my invention.

In Figures 1 and 2, I show a gear set comprising a pinion 5, a gear 6, and a suitable casing 7, the pinion 5 being located at one side of the gear 6. The pinion and gear illustrated are both of the double helical type, formed in halves with teeth inclined in opposite directions in the usual manner. The pinion 5 is rigidly mounted on a shaft 8, while the two halves of the gear 6 are rotatably mounted on a shaft 9 and are driven by, or drive, a centrally located spider 10 which I have shown rigidly secured to the shaft 9 between the gear halves. This construction and its purpose will be more fully disclosed hereinafter.

As shown, the pinion shaft 8 and the gear shaft 9 are mounted in opposite ends of two floating frames 11, 11, one of which is located at each end of the gearing but within the casing 7. The floating frames 11 extend from one shaft to the other and are adapted to pivot as shown about fulcrums 12 so located that the moments due to the torques of the transmission members are balanced.

The floating frames are independent of each other, that is, they may tilt in opposite directions, and, for this reason, I have shown the shafts 8 and 9 mounted in spherically seated bearings 13 and 14, respectively, near the ends of the floating frames.

In the apparatus illustrated, the movements of the floating frames 11, 11 are adapted to be regulated or opposed by means of springs 15 which are interposed between extensions 16, on the ends of the floating frames, and the casing 7. If desired, suitable means, such as a screw stop 17 illustrated in Figure 1, may be provided for limiting the movement of each of the floating frames. Obviously, the stops may be located at any convenient points. Furthermore, means may be provided for regulating the force of the springs 15, the arrangement illustrated in Fig. 4 being an example of adjustable means suitable for this purpose.

It is evident that if one end of the pinion 5 should be raised and the other end should be lowered, one half of the gear 6 would be slightly advanced in the direction of rotation as compared with the other half. The method of transmitting the torque from the gear to the shaft 9 by means of the centrally located spider 10 permits such relative movement on the part of the gear halves, and the spider and gears may, therefore, be termed a differential drive. As illustrated, the spider is connected to the gear halves by means of axially extending struts or arms 18 which are mounted on swiveling blocks 19 in the spider and are connected to the gear halves by ball and socket joints 20.

As illustrated in Figure 3, each block 19 is fitted in a slot 21 in the spider 10, the slot being subsequently closed by means of a key 22. As shown, the slot is somewhat wider than the block so that the latter may not only be free to swivel but also to have a limited movement in the direction of the force transmitted by the struts 18. This movement is opposed, in the apparatus illustrated, by means of springs 23 which I have shown on each side of the block 19 and fitting in recesses 24 in the spider 10. Centering lugs 25 are provided on each side of the block 19 on which the springs 23 loosely fit. It is evident that the springs illustrated serve to absorb shocks transmitted to the spider 10 or to the struts.

With the construction illustrated, both the gear and pinion are movably mounted and it is, therefore, desirable to employ flexible couplings 26 and 27 for connecting the gearing to other apparatus. These couplings may be of any suitable construction and, of course, may be dispensed with if the installation and operating conditions permit. The equalizing mechanism between the halves of the gear 6 permits relative movement therebetween and therefore tends to eliminate movement of the pinions 5 and the shaft 8 longitudinally, thereby avoiding the necessity for using a coupling which is capable of sliding movement.

In Figure 5, I show a construction in which only one floating frame 11 is employed, the opposite ends of the gear and pinion shafts being mounted in a fixed frame, preferably one side of the gear case. However, in this construction, like that of Figure 2, the gear and pinion shafts are mounted in universal bearings carried by the respective frames. The operation of the gear shown in Figure 5 is similar to that shown in Figure 2, except that the pinion tilts about an axis at one end instead of a median transverse axis.

Figure 6:
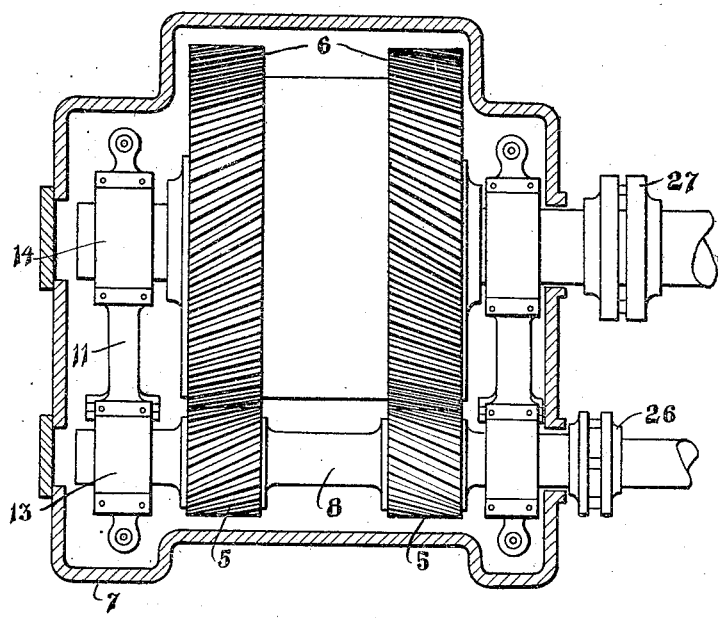

Figure 6 shows a construction in which the equalizing mechanism between the gears 6 has been omitted, the gear and pinion shafts being supported as in Figure 2 or as in Figure 5. As heretofore stated, the differential mechanism permits of the balancing of the tooth pressures without the pinion and its shaft moving longitudinally. Therefore, if the compensating mechanism between the gears is omitted and the gears are fixed rigidly to their shaft, proper balancing of tooth pressures may be secured merely by longitudinal movement of the pinion shaft. Hence, the structure shown in Figure 6 differs fundamentally over the other forms merely in the mode of balancing tooth pressures that is, by a relative axial movement of the gear and pinion members instead of by a relative rotational movement of the gear members. Accordingly, the pinion shaft 8 is capable of longitudinal movement for this purpose. The form of apparatus shown in this modification may have the gear and pinion shafts supported by floating frames and universal bearings such as shown in Figures 2 and 5.

The constructions illustrated are flexible and permit the gear members not only to compensate for deflections, due to the load imposed, but also to align themselves as the gearing is assembled. This eliminates considerable expensive work such as accurate checking up of the alignment. The introduction of springs provides means whereby shocks may be absorbed easily, thereby relieving the teeth of excessive instantaneous loads. The floating frames, of course, permanently maintain the center distances between the shafts 8 and 9 and consequently the teeth of the gear and pinion must always mesh on given contact circles.

While I have shown my invention in but three forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a gear set, the combination of co-operating gear members, shafts on which said members are mounted, floating frames extending from one shaft to the other and in which the shafts are mounted, and means for controlling the movements of the floating frames.

2. Reduction gearing comprising cooperating gear members and floating frames in which the gear members are mounted whereby one of said members may have a compensating tilting movement in a plane of revolution concentric with the other member.

3. Gearing having at least two cooperating gear members and a universal flexible mounting for said members comprising at least two floating frames extending from one member to the other whereby the gear members may have a tilting compensating movement.

4. Gearing having at least two cooperating gear members and a universal flexible mounting for said members comprising at least two independent floating frames extending from one member to the other whereby the gear members may have a tilting compensating movement.

5. Gearing comprising cooperating gear members, floating frames extending between and supporting said members, mounting means for the floating frames whereby said frames are independently tiltable, and resilient means for opposing movements of the floating frames.

6. Gearing comprising cooperating gear members formed in at least two sections, floating frames extending between and supporting said members, mounting means for the floating frames whereby said frames are independently tiltable, and differential power transmitting means associated with the sections of one of said members.

7. Gearing comprising cooperating gear members each of which consists of a plurality of sections, the gear sections of one of said members being relatively movable, and a floating frame associated with the gearing for maintaining a constant distance between the centers of the gear members and for permitting relative movements of the gear members.

8. Gearing comprising cooperating gear members formed in at least two sections, the sections of one of said members being relatively movable, differential power transmitting means for transmitting power to or from the relatively movable sections, and independently tiltable floating frames extending between and supporting the gear members.

9. Gearing comprising cooperating gear members formed in at least two sections, the sections of one of said members being relatively movable, differential power transmitting means for transmitting power to or from the relatively movable sections, independently tiltable floating frames extending between and supporting the gear members, and resilient means for opposing movements of the floating frames.

10. Gearing comprising cooperating gear members formed in at least two sections, the sections of one of said members being relatively movable, differential power transmitting means for transmitting power to or from the relatively movable sections, independently tiltable floating frames extending between and supporting the gear members, resilient means for opposing movements of the floating frames, and means for definitely limiting the movements of the floating frames.

11. Reduction gearing including a pinion, a gear driven thereby, a shaft on which the pinion is mounted, a shaft on which the gear is mounted, floating frames connecting the shafts at opposite ends of the gearing, pivotal supports for the frames, and means for resiliently opposing movements of the floating frames.

12. In a gear set, a gear divided into at least two independently movable sections, a spider for transmitting power to or from the sections, a pinion formed in the same number of sections as the gear and meshing therewith, and mounting means for the pinion whereby said pinion may move in a curved surface concentric with the gear in order to compensate for distortions or deflections.

13. In a reduction gear, the combination of meshing gears, shafts carrying the gears, universal bearings for the shafts, and a floating frame for the bearings at one end of the gearing.

14. In a reduction gear, the combination of meshing gears, shafts carrying the gears, universal tiltable bearings for supporting the shafts, and means for maintaining the distance between the axes of the pinion and gear shafts constant, one of the gear shafts being slidable longitudinally within its bearings.

15. In a reduction gear, the combination of meshing gears, shafts carrying the gears, universal tiltable bearings for the shafts, a floating frame for the bearings at one end of the gear, and a fulcrum for the floating frame located at such a point that the moments due to the torques of the gears are balanced.

16. In a reduction gear, the combination of meshing gears, shafts carrying the gears, universal tiltable bearings for supporting the shafts, means for supporting the bearings at a fixed distance apart, one of the means being tiltable about an axis, such that the moments due to the torques of the gears are balanced, in order to equalize the tooth pressures.

17. In a reduction gear, the combination of meshing gears, shafts carrying the gears, universal tiltable bearings for the shafts, floating frames supporting the bearings, and fulcrums for the floating frames located at such points relatively to the axes of the gears that moments relative thereto due to the torques of the gears are balanced.

18. In a reduction gear, the combination of meshing gears, shafts for supporting the gears, universal tiltable bearings for the shafts, frame members at the ends of the gear for supporting the bearings, at least one of the frame members being tiltable about an axis so disposed relatively to the gear axes that moments due to the torques of the gears are balanced, and means whereby the gear members may relatively so move as to balance tooth pressures.

In testimony whereof, I have hereunto subscribed my name this first day of April, 1921.

HENRY F. SCHMIDT.